(12) United States Patent
Aschenbrenner et al.

(10) Patent No.: US 12,351,130 B2
(45) Date of Patent: Jul. 8, 2025

(54) WHEEL STEP PLATFORM

(71) Applicant: Oshkosh Corporation, Oshkosh, WI (US)

(72) Inventors: Kelby Aschenbrenner, Oshkosh, WI (US); Andrew Mittelstadt, Oshkosh, WI (US); Dave Schmitz, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 311 days.

(21) Appl. No.: 17/971,792

(22) Filed: Oct. 24, 2022

(65) Prior Publication Data

US 2023/0129416 A1   Apr. 27, 2023

Related U.S. Application Data

(60) Provisional application No. 63/271,380, filed on Oct. 25, 2021.

(51) Int. Cl.
   *B60R 3/00* (2006.01)
(52) U.S. Cl.
   CPC .................................... *B60R 3/007* (2013.01)
(58) Field of Classification Search
   CPC .................................. B60R 3/007; B60R 3/02
   See application file for complete search history.

(56) References Cited

U.S. PATENT DOCUMENTS

| | | | | |
|---|---|---|---|---|
| 2,378,678 A | * | 6/1945 | Anderson | B60R 3/007 |
| | | | | 280/165 |
| 2,973,052 A | * | 2/1961 | Miller | B60R 3/007 |
| | | | | 182/150 |
| 4,782,916 A | * | 11/1988 | Hays | B60R 3/007 |
| | | | | 280/165 |
| 4,947,961 A | * | 8/1990 | Dudley | B60R 3/007 |
| | | | | 280/165 |
| 5,111,909 A | * | 5/1992 | Liu | B60R 3/007 |
| | | | | 280/165 |

(Continued)

FOREIGN PATENT DOCUMENTS

WO   WO-2009155608 A2 * 12/2009 ............. B60R 3/007

OTHER PUBLICATIONS

WO-2009155608-A2 English Translation (Year: 2009).*

*Primary Examiner* — James A Shriver, II
*Assistant Examiner* — Michael T. Walsh
(74) *Attorney, Agent, or Firm* — FOLEY & LARDNER LLP

(57) ABSTRACT

A step platform includes a mounting bar, an arm, an inner portion, and a platform. The arm is coupled to the mounting bar and extends vertically from the mounting bar. The arm is coupled to the mounting bar by a first joint. The inner portion is coupled to the arm and extends horizontally from the arm. The inner portion is coupled to the arm by a second joint. The platform extends horizontally above the inner portion. The platform is configured to support a user. The step platform is reconfigurable between a folded position and a mounted position by pivoting the mounting bar relative to the first joint and pivoting the arm relative to the second joint. The platform engages with a tractive element when the step platform is in the mounted position. The mounting bar is extendable or retractable to modify a length and a width of the mounting bar.

18 Claims, 10 Drawing Sheets

(56) References Cited

U.S. PATENT DOCUMENTS

| | | | | |
|---|---|---|---|---|
| 5,133,429 | A | * | 7/1992 | Densley .................. B60R 3/007 |
| | | | | 280/165 |
| 6,767,023 | B1 | * | 7/2004 | Nicholson ............... B60R 3/007 |
| | | | | 280/165 |
| 7,059,449 | B2 | * | 6/2006 | Zhang .................... B60R 3/007 |
| | | | | 280/165 |
| 7,168,523 | B1 | * | 1/2007 | Tafoya ................... B60R 3/007 |
| | | | | 280/165 |
| 9,821,716 | B1 | * | 11/2017 | Hernandez ............. B60R 3/007 |
| 2007/0256896 | A1 | * | 11/2007 | Huang ................... B60R 3/007 |
| | | | | 182/150 |

* cited by examiner

WHEEL STEP PLATFORM

CROSS-REFERENCE TO RELATED PATENT APPLICATION

This application claims the benefit of and priority to U.S. Provisional Patent Application No. 63/271,380, filed on Oct. 25, 2021, which is incorporated herein by reference in its entirety.

BACKGROUND

The present invention relates generally to the field of platforms for use on vehicles. More specifically, the present invention relates to individual platforms that are mounted onto vehicles.

SUMMARY OF THE INVENTION

One embodiment of the invention relates to a step platform for a vehicle. The step platform includes a mounting bar, an arm, an inner portion, and a platform. The arm is coupled to the mounting bar and extends vertically from the mounting bar. The arm is coupled to the mounting bar by a first joint. The inner portion is coupled to the arm and extends horizontally from the arm. The inner portion is coupled to the arm by a second joint. The platform extends horizontally above the inner portion. The platform is configured to support a user. The step platform is reconfigurable between a folded position and a mounted position by pivoting the mounting bar relative to the first joint and pivoting the arm relative to the second joint. An edge of the platform engages with a tractive element when the step platform is in the mounted position. The mounting bar is extendable or retractable to modify a length and a width of the mounting bar.

Another embodiment of the invention relates to a vehicle. The vehicle includes a chassis, one or more tractive elements coupled to the chassis, and a wheel step platform reconfigurable between a folded positon and a mounted position. The wheel step platform includes a mounting bar, a set of arms coupled to the mounting bar, and a platform. The set of arms includes a first arm and a second arm. The platform is coupled to the set of arms and extends along a length of the mounting bar. When the wheel step platform is in the mounted position, the mounting bar is at least partially engaged with one of the plurality of tractive elements to permit a user access to the vehicle. An edge of the platform engages with a tractive element when the step platform is in the mounted position. The mounting bar is extendable or retractable to modify a length and a width of the mounting bar.

Another embodiment of the invention relates to a vehicle. The vehicle includes a chassis, a plurality of tractive elements coupled to the chassis, and a wheel step platform. The wheel step platform is reconfigurable between a folded position and a mounted position. The wheel step platform includes a mounting bar, an arm, and a platform. The mounting bar includes one or more portions telescopically engaged with one another. The one or more portions are telescopically engaged in both a lateral x-direction and a lateral y-direction. The arm is coupled to the mounting bar by a first joint. The platform is configured to support a user. The platform is coupled to the arm by an inner portion. The inner portion is coupled to the arm by a second joint. The wheel step platform is reconfigurable between a folded position and a mounted position by pivoting the mounting bar relative to the first joint and pivoting the arm relative to the second joint. When the wheel step platform is in the mounted position, the mounting bar is arranged parallel with the platform.

This summary is illustrative only and is not intended to be in any way limiting. Other aspects, inventive features, and advantages of the devices or processes described herein will become apparent in the detailed description set forth herein, taking in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
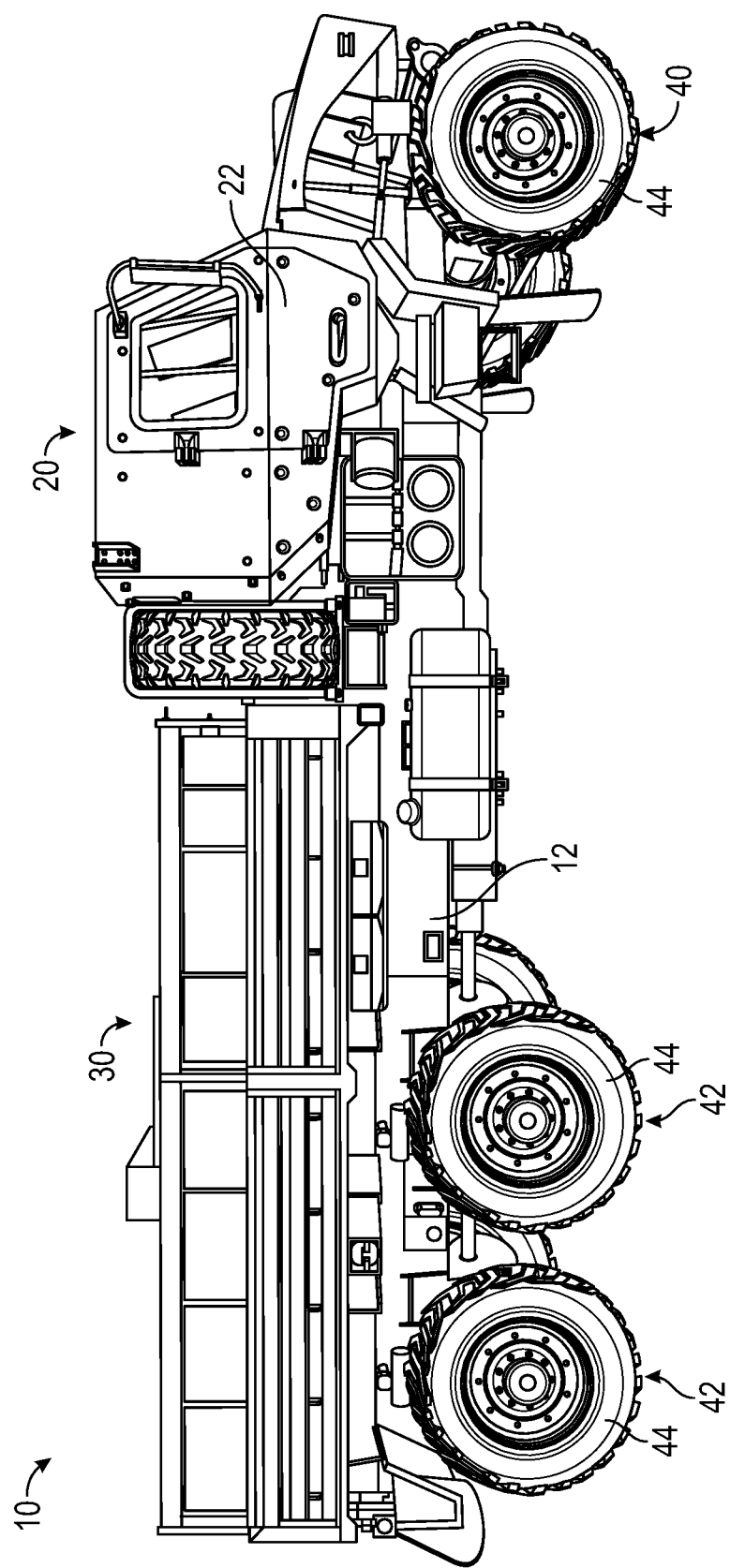
FIG. 1 is a side view of a vehicle, according to an exemplary embodiment.

According to the exemplary embodiment shown in FIG. 1, a vehicle, shown as vehicle 10, includes a chassis, shown as frame 12, that supports a body assembly including a first portion, shown as front cab 20, and a second portion, shown as mission equipment 30. As shown in FIG. 1, the mission equipment 30 is disposed behind the front cab 20. The frame 12 of the vehicle 10 engages a plurality of tractive assemblies, shown as front tractive assemblies 40 and rear tractive assemblies 42. According to an exemplary embodiment, the vehicle 10 is a military ground vehicle. In other embodiments, the vehicle 10 is an off-road vehicle such as a utility task vehicle, a recreational off-highway vehicle, an all-terrain vehicle, a sport utility vehicle, and/or still another vehicle. In yet other embodiments, the vehicle 10 is another type of off-road vehicle such as mining, construction, and/or farming equipment. In still other embodiments, the vehicle 10 is an aerial truck, a rescue truck, an aircraft rescue and firefighting (ARFF) truck, a concrete mixer truck, a refuse truck, a commercial truck, a tanker, an ambulance, and/or still another vehicle.

According to an exemplary embodiment, the frame 12 defines a longitudinal axis. The longitudinal axis may be generally aligned with a frame rail of the frame 12 of the vehicle 10 (e.g., front-to-back, etc.). In some embodiments, the vehicle 10 includes a plurality of front tractive assemblies 40 and/or a plurality of rear tractive assemblies 42 (e.g., one, two, etc.). The front tractive assemblies 40 and/or the rear tractive assemblies 42 may include brakes (e.g., disc brakes, drum brakes, air brakes, etc.), gear reductions, steering components, wheel hubs, wheels, tires, and/or other features. As shown in FIG. 1, the front tractive assemblies 40 and the rear tractive assemblies 42 each include tractive elements, shown as wheel and tire assemblies 44. In other embodiments, at least one of the front tractive assemblies 40 and the rear tractive assemblies 42 include a different type of tractive element (e.g., a track, etc.).

According to an exemplary embodiment, the front cab 20 includes one or more doors, shown as doors 22, that facilitate entering and exiting an interior of the front cab 20. The interior of the front cab 20 may include a plurality of seats (e.g., two, three, four, five, etc.), vehicle controls, driving components (e.g., steering wheel, accelerator pedal, brake pedal, etc.), etc. According to the exemplary embodiment shown in FIG. 1, the mission equipment 30 includes a cargo body configured to facilitate transporting various military equipment (e.g., medical supplies, ammunition, weapons, missiles, personnel, etc.). In other embodiments, the mission equipment 30 includes a truck bed or a flat bed. In some embodiments, the mission equipment 30 additionally or alternatively includes a boom lift. In another embodiment, the mission equipment 30 includes an at least partially enclosed troop transport cab configured to facilitate transporting troops (e.g., eight, ten, twelve, twenty, etc.) with the vehicle 10.

According to an exemplary embodiment, the vehicle 10 includes a powertrain system. The powertrain system may include a primary driver (e.g., an engine, a motor, etc.), an energy generation device (e.g., a generator, etc.), and/or an energy storage device (e.g., a battery, capacitors, ultracapacitors, etc.) electrically coupled to the energy generation device. The primary driver may receive fuel (e.g., gasoline, diesel, etc.) from a fuel tank and combust the fuel to generate mechanical energy. A transmission may receive the mechanical energy and provide an output to the generator. The generator may be configured to convert mechanical energy into electrical energy that may be stored by the energy storage device. The energy storage device may provide electrical energy to a motive driver to drive at least one of the front tractive assemblies 40 and the rear tractive assemblies 42. In some embodiments, each of the front tractive assemblies 40 and/or the rear tractive assemblies 42 include an individual motive driver (e.g., a motor that is electrically coupled to the energy storage device, etc.) configured to facilitate independently driving each of the wheel and tire assemblies 44. In some embodiments, a transmission of the vehicle 10 is rotationally coupled to the primary driver, a transfer case assembly, and one or more drive shafts. The one or more drive shafts may be received by one or more differentials configured to convey the rotational energy of the drive shaft to a final drive (e.g., half-shafts coupled to the wheel and tire assemblies 44, etc.). The final drive may then propel or moves the vehicle 10. In such embodiments, the vehicle 10 may not include the generator and/or the energy storage device. The powertrain of the vehicle 10 may thereby be a hybrid powertrain or a non-hybrid powertrain. According to an exemplary embodiment, the primary driver is a compression-ignition internal combustion engine that utilizes diesel fuel. In alternative embodiments, the primary driver is another type of device (e.g., spark-ignition engine, fuel cell, electric motor, etc.) that is otherwise powered (e.g., with gasoline, compressed natural gas, hydrogen, electricity, etc.).

Wheel Step Platform

Figure 2:
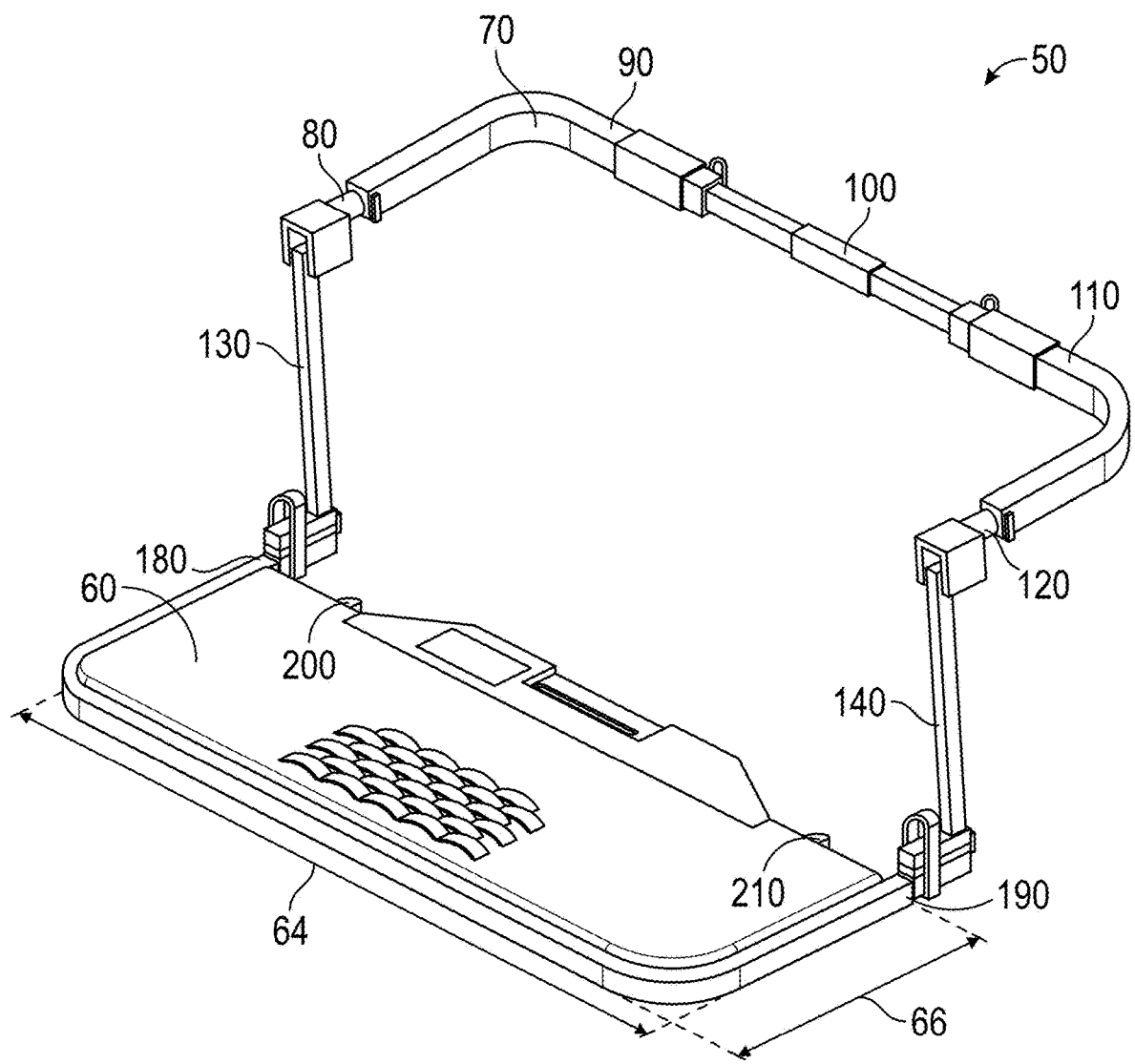
FIG. 2 is a perspective view of a wheel step platform, in an extended position, according to an exemplary embodiment.

Referring now to FIG. 2, a perspective view of a platform, shown as wheel step platform 50, is shown. The wheel step platform 50 is defined to be a platform that is selectively coupled to one of the wheels on the tire assemblies 44 where an operator stands on the wheel step platform 50 such to reach different components in the vertical direction. The wheel step platform 50 includes a platform 60 and a mounting bar 70 coupled to either end of the platform 60. The platform 60 is defined to be a rectangular platform. In some embodiments, the platform 60 can be of a plurality of different geometrical configurations. The platform 60 is configured to support an operator in an upright position when the operator is using (e.g., standing, sitting, kneeling, etc.) the wheel step platform 50. The platform 60 is further configured to be a wire grate, where the operator stands on the grate. In some embodiments, the platform 60 is a solid platform. In still some embodiments, at least a portion of the platform 60 comprises a grate.

The platform 60 further includes a length, shown as platform length 64, and a width, shown as platform width 66, extending perpendicular from the platform length 64. The platform length 64 is defined to be greater than the platform width 66. In some embodiments, the platform length 64 is defined to be less than the platform width 66. In still some embodiments, the platform length 64 is the same as the platform width 66, such that the platform 60 defines a square geometry.

Figure 3:
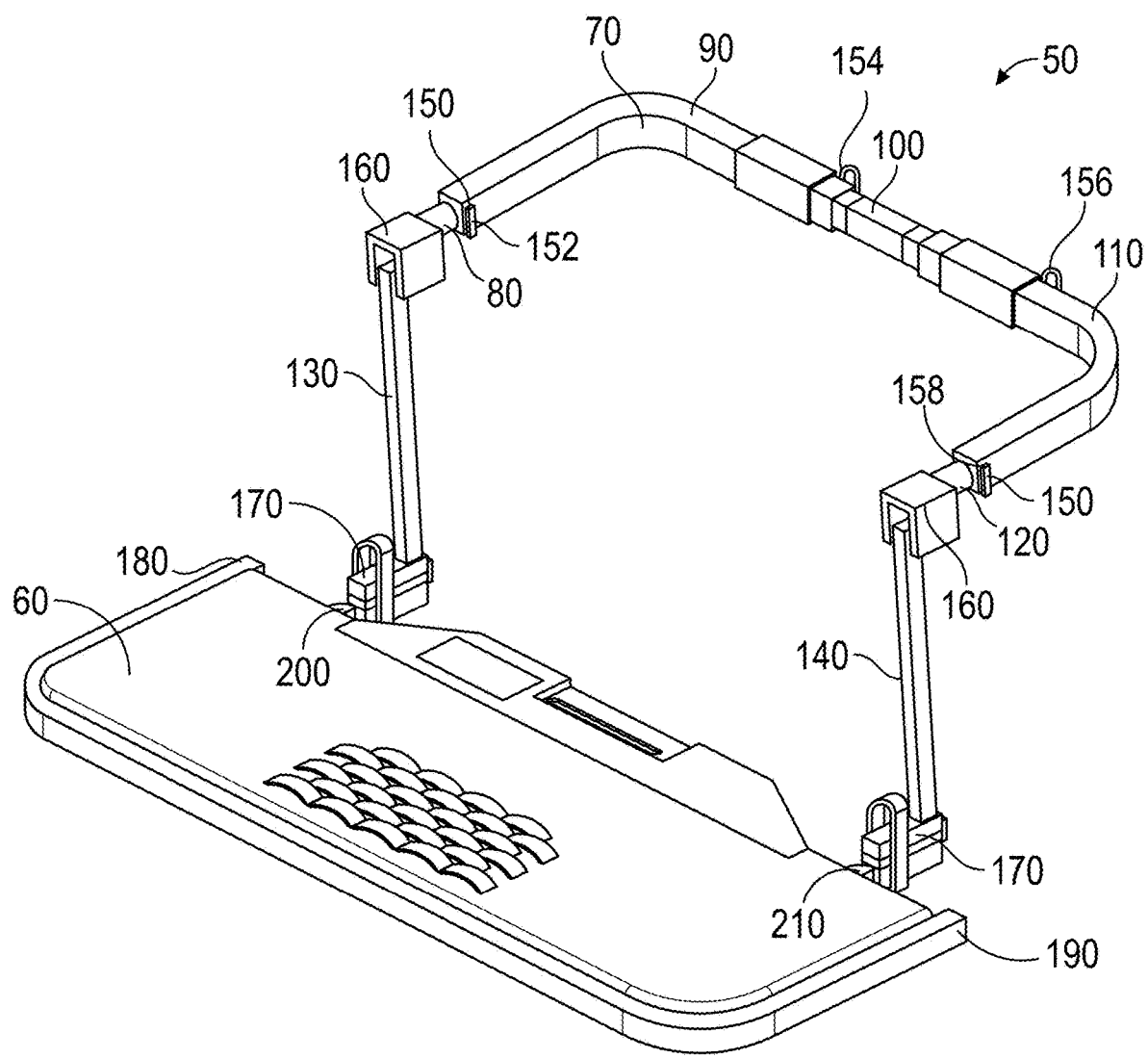
FIG. 3 is a perspective view of the wheel step platform of FIG. 2, in a retracted position, according to an exemplary embodiment.
Figure 4:
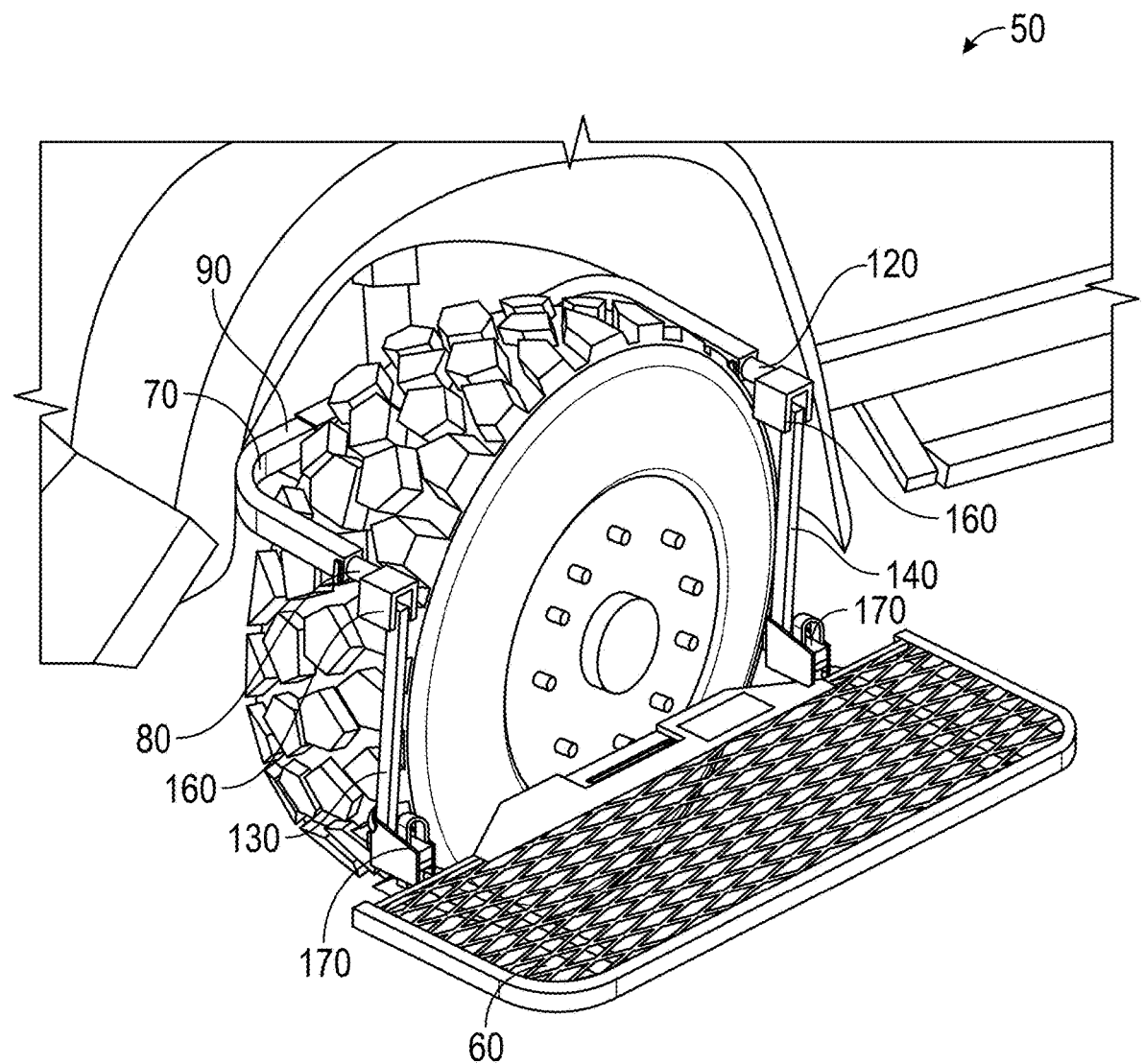
FIG. 4 is a perspective view of the wheel step platform of FIG. 2, mounted onto a wheel, according to an exemplary embodiment.
Figure 5:
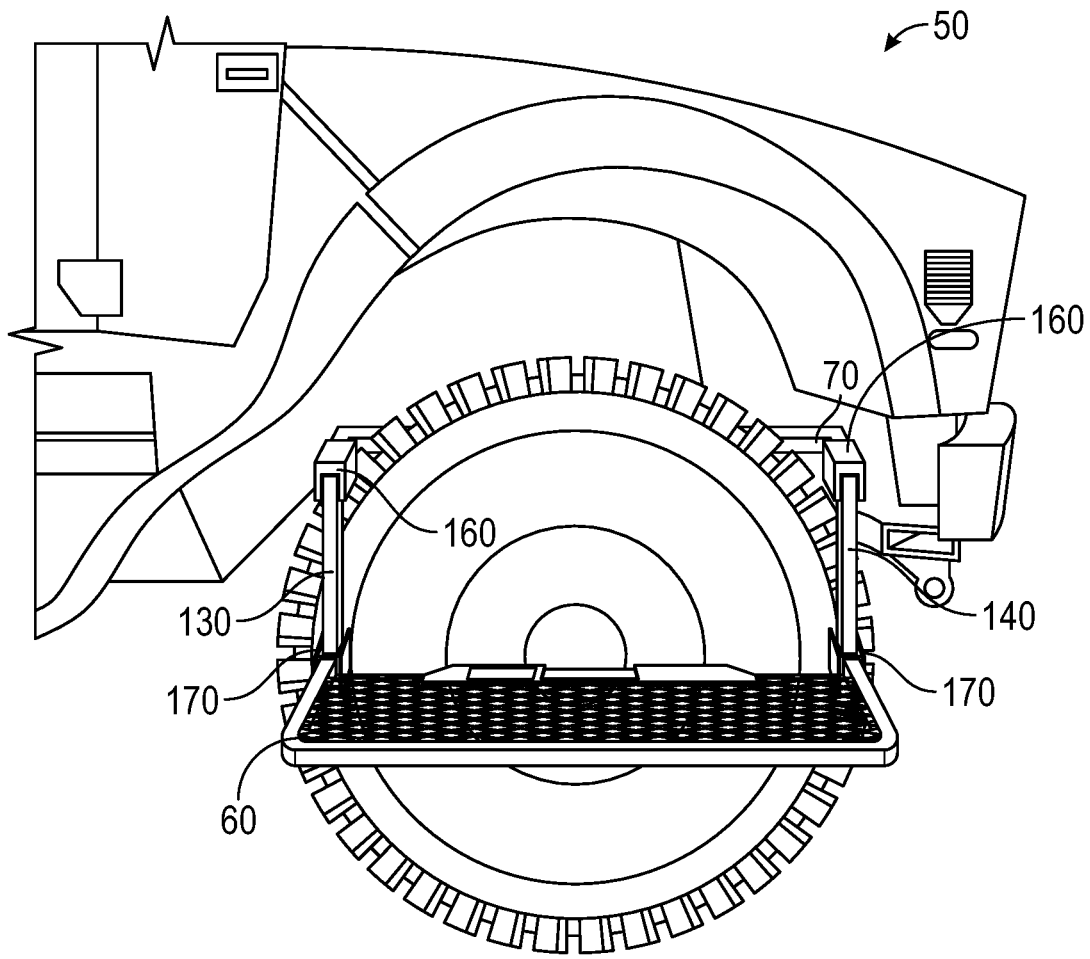
FIG. 5 is a front view of the wheel step platform of FIG. 2, mounted onto a wheel, according to an exemplary embodiment.
Figure 6:
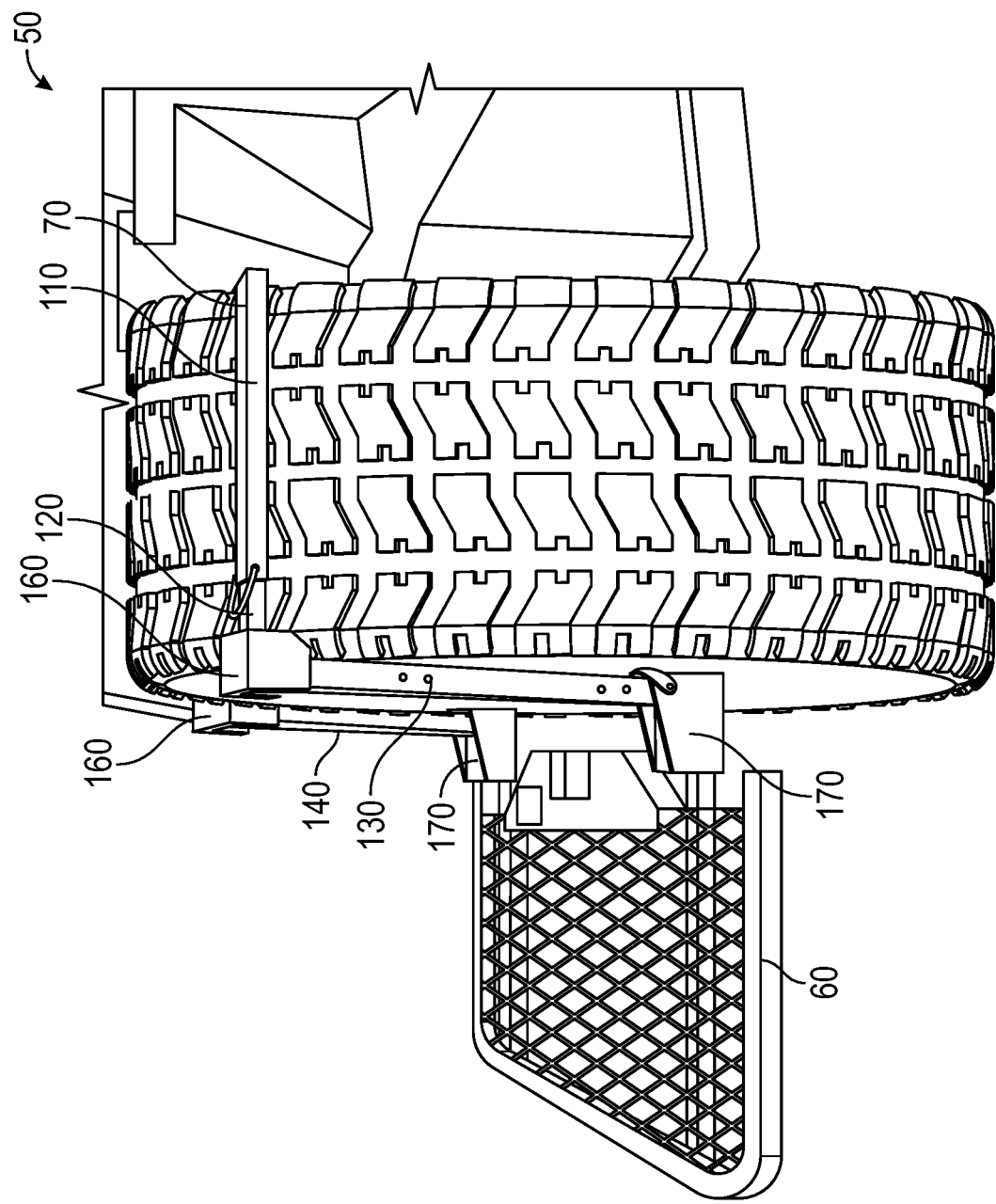
FIG. 6 is a side view of the wheel step platform of FIG. 2, mounted onto a wheel, according to an exemplary embodiment.
Figure 7:
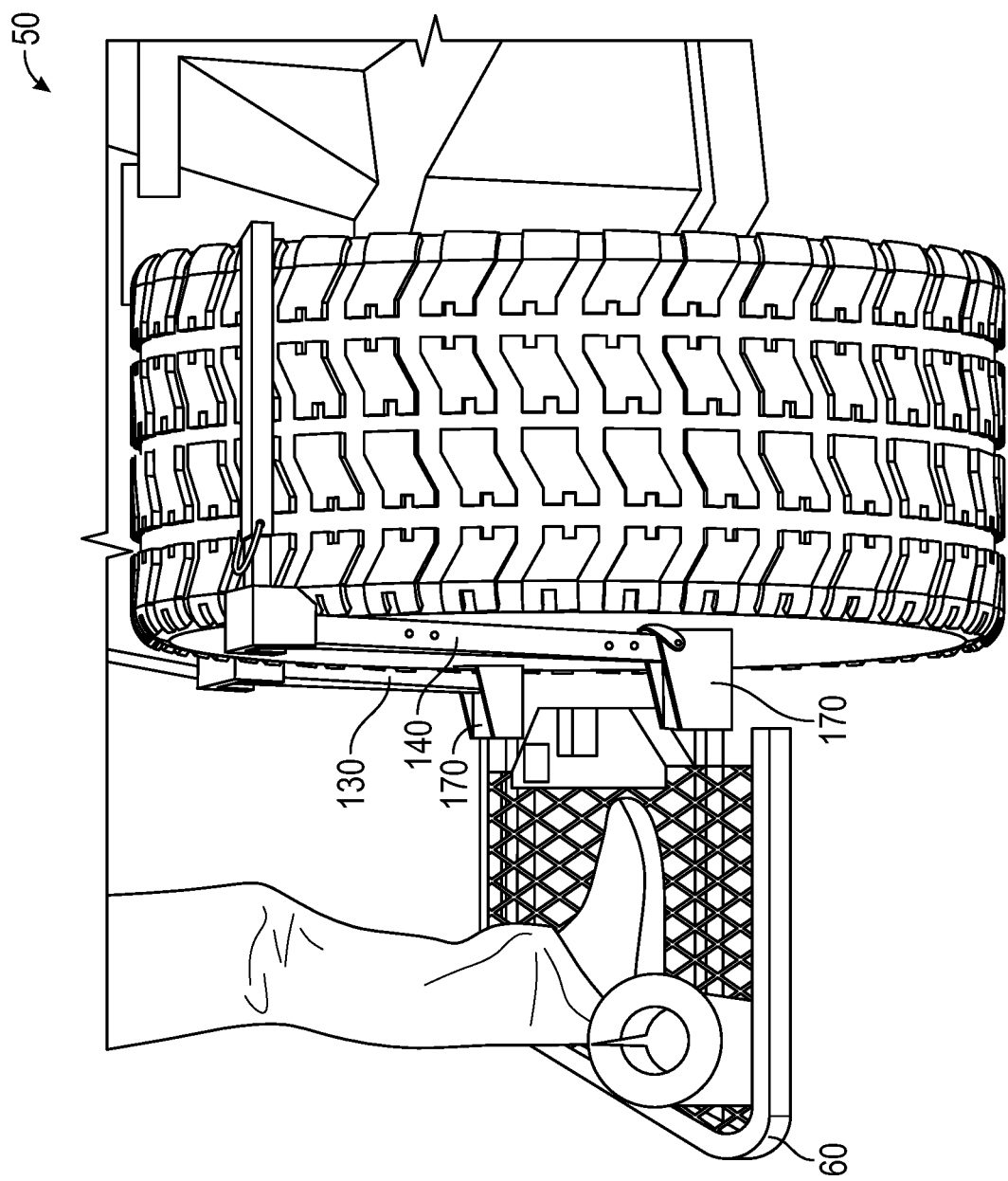
FIG. 7 is a side view of the wheel step platform of FIG. 6, in use by an operator, according to an exemplary embodiment.

The mounting bar 70 is a modular bar comprising a plurality of portions, or tubes, shown as first portion 80, a second portion 90, a third portion 100, a fourth portion 110, and a fifth portion 120. As shown in at least FIGS. 2 and 3, the first portion 80, the second portion 90, the third portion 100, the fourth portion 110, and the fifth portion 120 each define a tubular structure (e.g., a first tube 80, a second tube 90, a third tube 100, a fourth tube 110, and a fifth tube 120). The first portion 80, third portion 100, and fifth portion 120 are defined to be dimensionally smaller than both the second portion 90 and the fourth portion 110. To be more precise, the mounting bar 70 is a telescoping bar where the first portion 80, the third portion 100, and fifth portion 120 may translate within at least one of the second portion 90 and the fourth portion 100 such that the wheel step platform 50 can be mounted onto a plurality of different wheel dimensions. In other words, as shown in FIGS. 2 and 3, the first tube 80 is configured to selectively telescope into and out of a first end of the second tube 90, the third tube 100 is configured to selectively telescope into and out of a second end of the second tube 90, the fourth tube 120 is configured to selectively telescope into and out of a first end of the fourth tube 120, and the third tube 100 is configured to selectively telescope into and out of a second end of the fourth tube 120. The mounting bar 70 may be telescopically engaged in both a lateral x-direction and a lateral y-direction to modify a length and a width of the mounting bar 70. In some embodiments, the mounting bar 70 is a fixed bar that can be mounted on a limited amount of tire dimensions. The second portion 90 and the fourth portion 110 are defined to be angled portions of the mounting bar 70. For example, the second portion 90 may define a first elbow portion or tube 90 and the fourth portion 110 may define a second elbow portion or tube 110. By way of example, the second portion 90 and the fourth portion 110 are right angle (e.g., 90 degree) portions. In some embodiments, the second portion 90 and the fourth portion 110 are angled portions that include an angle greater than 90 degrees. In still some embodiments, the second portion 90 and the fourth portion 110 are angled portions that include an angle less than 90 degrees.

The mounting bar 70 is configured to be selectively repositionable between a first position, second position, and third position shown as, an extended position, a retracted position, and an intermediate position. In the extended position, the smaller portions 80, 100, and 120 (e.g., the first portion 80, third portion 100, and fifth portion 120) are fully extended from the larger portions 90 and 110 (e.g., the second portion 90 and the fourth portion 110). In some embodiments, the smaller portions 80, 100, and 120 may be at least partially disposed within the larger portions 90 and 110 when in the extended position. In still some embodiments, the smaller portions 80, 100, and 120 may be fully extended out of engagement with the larger portions 90 and 110 where the smaller portions 80, 100, and 120 include stops that abut ends of the larger portions 90 and 110. In the retracted position, the smaller portions 80, 100, and 120 are fully retracted into the larger portions 90 and 110. In some embodiments, the smaller portions 80, 100, and 120 may be at least partially out of engagement with the larger portions 90 and 110. The intermediate position is defined to be any position between the extended position and the retracted position where at least a portion of the smaller portions 80, 100, and 120 are disposed within the larger portions 90 and 110. By way of example, the extended position is defined to be the position where the mounting bar 70 is at a maximum length dimension and the retracted position is defined to be the position where the mounting bar 70 is at a minimum length dimension.

The wheel step platform 50 further comprises a set of vertical extending arms, shown as first arm 130 and second arm 140. The set of arms 130 and 140 are defined to be dimensionally similar. In some embodiments, the set of arms 130 and 140 are dimensionally different to one another and, as such, extend through different lengths. The set of arms 130 and 140 are pivotally coupled to both the platform 60 and the mounting bar 70 at adjacent ends. By way of example, the first arm 130 is pivotally coupled to the first portion 80 and the second arm 140 is pivotally coupled to the fifth portion 120. In some embodiments, the set of arms 130 and 140 are telescoping arms, where portions of the set of arms 130 and 140 are disposed within such to change the height of the wheel step platform. In such an embodiment, the operator may adjust the wheel step platform 50 into the longest setting such to reach components that are positioned more vertical than others.

Referring specifically to FIG. 2, the wheel step platform 50 is shown when the mounting bar 70 is in the extended position. As shown, the mounting bar 70 extends along the entire length of the platform 60. In some embodiments, the mounting bar 70 extends along a portion of the platform 60 when in the extended position. When the mounting bar 70 is in the extended position, the mounting bar 70 is defined to have a length of 47.25 inches. In some embodiments, the length of the mounting bar 70 is greater than 47.25 inches when in the extended position. In still some embodiments, the length of the mounting bar 70 is less than 47.25 inches when in the extended position.

Referring now to FIG. 3, the wheel step platform 50 is shown when the mounting bar 70 is in the retracted position. As shown, the mounting bar 70 extends along a portion of the entire length of the platform 60 when in the retracted position. In some embodiments, the mounting bar 70 along the entire length of the platform 60 when in the retracted position. When the mounting bar 70 is in the retracted position, the mounting bar 70 is defined to have a length of 35.25 inches. In some embodiments, the length of the mounting bar 70 is greater than 35.25 inches when in the retracted position. In still some embodiments, the length of the mounting bar 70 is less than 35.25 inches when in the extended position.

Referring generally to FIGS. 2 and 3, the wheel step platform 50 further includes locking mechanisms 150 positioned at a plurality of positions along the length of the mounting bar 70. The locking mechanisms 150 are configured to lock at least one of the plurality of portions 80, 90, 100, 110, and 120 in a defined location. By way of example, when the mounting bar 70 is extended or retracted into the desired location, the locking mechanism 150 locks the plurality of portions 80, 90, 100, 110, and 120 to form a rigid structure. The mounting bar 70 includes four locking mechanisms 150, two locking mechanisms 150 positioned at either end of the second portion 90 and two locking mechanisms 150 positioned at either end of the fourth portion 110. As shown, a first locking mechanism 152 interfaces with the first portion 80 and the second portion 90, a second locking mechanism 154 interfaces with the second portion 90 and the third portion 100, a third locking mechanism 156 interfaces with the third portion 100 and the fourth portion 110, and a fourth locking mechanism 158 interfaces with the fourth portion 110 and the fifth portion 120.

The combination of the first portion 80 with the first locking mechanism 152 and the fifth portion 120 with the fourth locking mechanism 158 are configured to control the width of the mounting bar 70. By way of example, the first locking mechanism 152 and the fourth locking mechanism 158 can be disengaged, allowing the first portion 80 and the fifth portion 120 to translate in and out of the second portion 90 and the fourth portion 110 to change the width of the mounting bar 70. In some embodiments, the combination of the first portion 80 with the first locking mechanism 152 and the fifth portion 120 with the fourth locking mechanism 158 are configured to control the length of the mounting bar 70. The combination of the third portion 100 with both the second locking mechanism 154 and the third locking mechanism 156 are configured to control the length of the mounting bar 70. By way of example, the second locking mechanism 154 and the third locking mechanism 156 can be disengaged, allowing the third portion 100 to translate in and out of engagement of the second portion 90 and the fourth portion 110 to change the length of the mounting bar 70. In some embodiments, the combination of the third portion 100 with both the second locking mechanism 154 and the third locking mechanism 156 are configured to control the width of the mounting bar 70.

In some embodiments, the locking mechanisms 150 are clevis pins. The clevis pins may be inserted into at least one of the plurality of portions 80, 90, 100, 110, and 120 where the other end of the clevis pin interfaces with a latching mechanism. The latching mechanism may be one of a cotter pin, a wire lock, a chain, or the like. By way of example, the plurality of portions 80, 90, 100, 110, and 120 include a plurality of holes configured to receive the clevis pin within. The plurality of holes are positioned at various positions such to allow the clevis pins to engage and change the dimensions (e.g., length and width) of the mounting bar 70.

In some embodiments, the locking mechanisms 150 are spring loaded pins. The spring loaded pins are disposed within the plurality of portions 80, 90, 100, 110, and 120 and are configured to extend through at least one of the plurality of holes. By way of example, the operator may push the spring loaded pins down to disengage from the plurality of portions 80, 90, 100, 110, and 120 where the operator may translate the plurality of portions 80, 90, 100, 110, and 120 to desired mounting bar 70 dimensions, where the spring loaded pins may reengage to lock the mounting bar 70.

In some embodiments, the locking mechanisms 150 are locking quick-release pins. The locking quick-release pins are inserted into at least one of the plurality of portions 80, 90, 100, 110, and 120 where the other end of the locking quick-release pin interfaces with a dimensionally similar receiver. The end of the locking quick-release pin that interfaces with the receiver includes a button that is configured to latch the locking mechanism 150. The button can be a rigid structure fixedly coupled to the locking quick-release pin or a spring loaded button that is selectively extended or retracted. By way of example, the operator inserts the locking quick-release pin through the plurality of holes when they wish to lock the mounting bar 70 at a desired dimension.

In some embodiments, the locking mechanisms 150 are retractable pins. The retractable pins comprise a handle, a receiving end, a housing, and a spring disposed within the housing. The housing is coupled to at least one of the second portion 90 and the fourth portion 110. The spring is configured to maintain the retractable pin into a locked position. By way of example, the operator pulls on the handle, in a force greater than the spring, to release the receiving end from engagement. Once the receiving end is out of engagement, the plurality of portions 80, 90, 100, 110, and 120 are able to slide until the mounting bar 70 is in desired dimensions.

In some embodiments, the locking mechanisms 150 are fasteners. The fasteners are at least partially disposed within the plurality of holes. The fasteners may be screws, bolts, or the like. By way of example, the fasteners may be threaded into engagement such to lock the mounting bar 70. By way of another example, the fasteners may be disposed through the entire plurality of portions 80, 90, 100, 110, and 120 where the fasteners are threaded into a nut, or the like.

The wheel step platform 50 further includes pivotable joints, shown as first pivoting joints 160 and second pivoting joints 170. The first pivoting joints 160 are positioned proximal to the mounting bar 70 and coupled to the first portion 80 and the fifth portion 120. The first pivoting joints 160 are configured to facilitate pivoting the mounting bar 70 between a raised position and a lowered position. To be more precise, the mounting bar 70 is selectively repositionable between the raised position, where the mounting bar 70 is ready for use, and the lowered position, where the mounting bar 70 is compacted and stowed. The second pivoting joints 170 are positioned proximal to the platform 60 and coupled to the first arm 130 and the second arm 140. The second pivoting joints 170 are configured to facilitate pivoting the set of arms 130 and 140 between a raised position and a lowered position. To be more precise, the set of arms 130 and 140 are selectively repositionable between a raised position, where the set of arms 130 and 140 are not positioned parallel to the platform 60, and a lowered position, where the set of arms 130 and 140 are positioned parallel to the platform 60. The first pivoting joints 160 are defined to pivot about a 270 degree orientation. In some embodiments, the first pivoting joints 160 are defined to pivot less than 270 degrees. In still some embodiments, the first pivoting joints 160 are defined to pivot greater than 270 degrees. The second pivoting joints 170 are defined to pivot about a 90 degree orientation. In some embodiments, the second pivoting joints 170 are defined to pivot less than 90 degrees. In still some embodiments, the second pivoting joints 170 are defined to pivot greater than 90 degrees.

The set of pivotable joints 160 and 170 are configured to selectively reposition the wheel step platform 50 between a mounted position and a folded position. The mounted position is defined to be a plurality of positions where at least one of the set of arms 130 and 140 are not positioned parallel to the platform 60. The folded position is defined to be the position where both the set of arms 130 and 140 and the mounting bar 70 are positioned parallel to the platform 60. By way of example, the wheel step platform 50 pivots (e.g., rotates) about the first pivoting joints 160 and the second pivoting joints 170 to reposition between the mounted position and the folded position. To position the wheel step platform 50 into the folded position, the operator may first pivot the mounting bar 70 about the first pivoting joints 160 and then pivot the set of arms 130 and 140 about the second pivoting joints 170. In some embodiments, to position the wheel step platform 50 into the folded position, the operator may first pivot the set of arms 130 and 140 about the second pivoting joints 170 and then pivot the mounting bar 70 about the first pivoting joints 160.

In some embodiments, the set of pivotable joints 160 and 170 pivot into an intermediate position where the set of arms 130 and 140 and the mounting bar 70 are positioned into a plurality of configurations. The intermediate position is defined to be any position between the raised and lowered positions that the set of pivotable joints 160 and 170 rotate within. In the intermediate position, the first pivoting joint 160 is rotated a different angular dimension from the second pivoting joint 170. In some embodiments, the first pivoting joint 160 is rotated a similar angular dimension from the second pivoting joint 170.

Referring now to FIGS. 4-8, various views of the wheel step platform 50 are shown, mounted onto a wheel. As shown, when mounted onto a wheel, the wheel step platform 50 is configured to be positioned along the bottom half of the wheel (e.g., below the midpoint of the wheel) where the mounting bar 70 is positioned along the upper half of the wheel (e.g., above the midpoint of the wheel). By way of example, the position of the wheel step platform 50 against the wheel is determined off the size of the wheel. According to an exemplary embodiment, when the mounting bar 70 is in the extended position, the wheel step platform 50 is mounted onto wheels measuring 395/85R20, or the like. In some embodiments, the wheel step platform 50 is mounted onto wheels larger than 395/85R20 when the mounting bar 70 is in the extended position. In still some embodiments, the wheel step platform 50 is mounted onto wheels smaller than 395/85R20 when the mounting bar 70 is in the extended position. According to another exemplary embodiment, when the mounting bar 70 is in the retracted position, the wheel step platform 50 is mounted onto wheels measuring 365/80R20, or the like. In some embodiments, the wheel step platform 50 is mounted onto wheels larger than 360/80R20 when the mounting bar 70 is in the retracted position. In still some embodiments, the wheel step platform 50 is mounted onto wheels smaller than 365/80R20 when the mounting bar 70 is in the retracted position.

Figure 8:
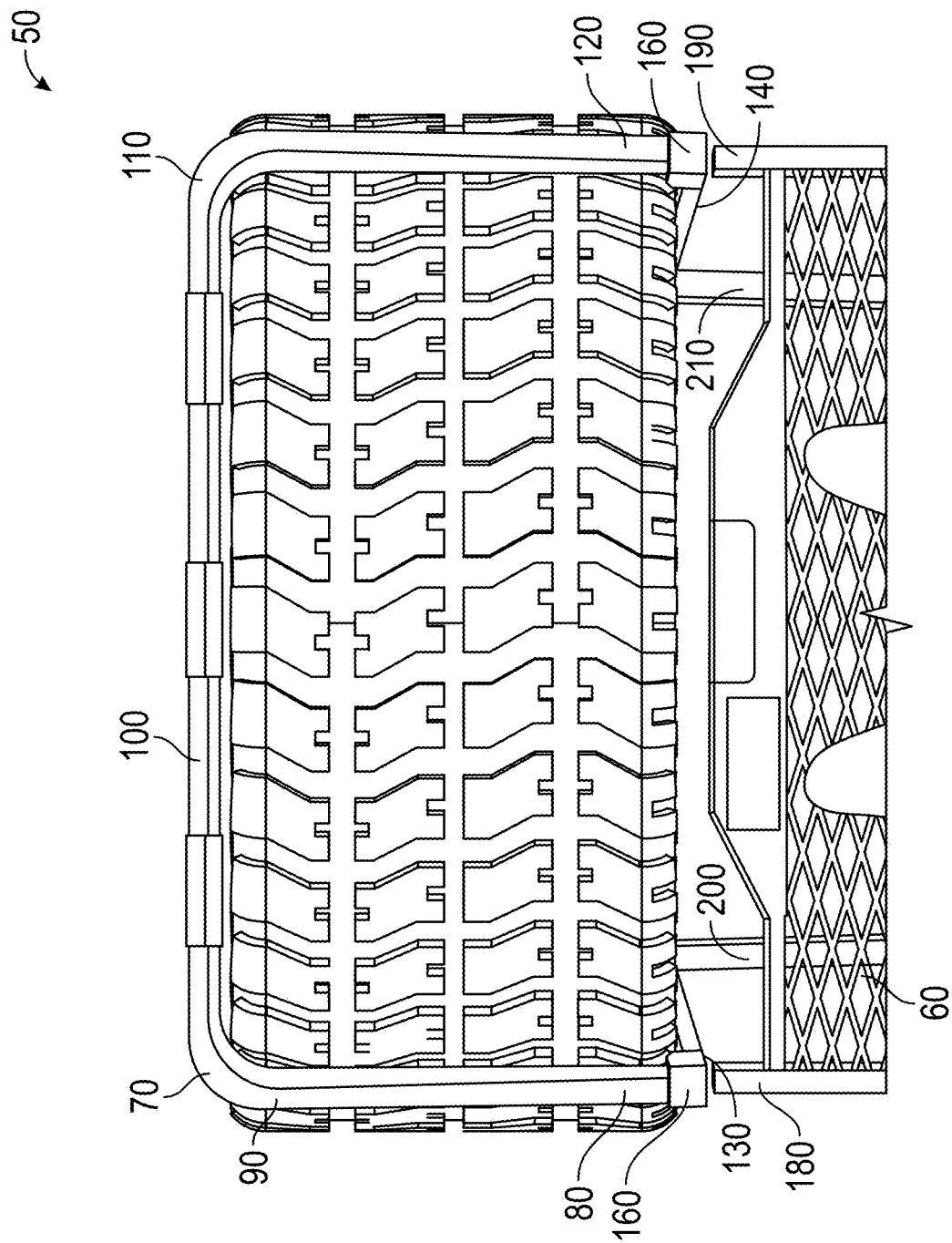
FIG. 8 is a top view of the wheel step platform of FIG. 2, mounted onto a wheel, according to an exemplary embodiment.

Referring specifically to FIG. 8, the wheel step platform 50 includes a set of outer receivers, shown as first outer receiver 180 and second outer receiver 190, and a set of inner receivers, shown as first inner receiver 200 and second inner receiver 210. The set of outer receivers 180 and 190 are further defined to be the outer edge of the platform 60. The set of outer receivers 180 and 190 and the set of inner receivers 200 and 210 are configured to selectively receive the first arm 130 and the second arm 140. Both the first outer receiver 180 and the first inner receiver 200 are selectively coupled to the first arm 130. Both the second outer receiver 190 and the second inner receiver 210 are selectively coupled to the second arm 140. In some embodiments, the first outer receiver 180 and the first inner receiver 200 are selectively coupled to the second arm 140 and the second outer receiver 190 and the second inner receiver 210 are selectively coupled to the first arm 130. By way of example, when mounting bar 70 is in the extended position, the first arm 130 is coupled to the first outer receiver 180 and the second arm 140 is coupled to the second outer receiver 190. By way of another example, when the mounting bar 70 is in the retracted position, the first arm 130 is coupled to the first inner receiver 200 and the second arm 140 is coupled to the second inner receiver 210. By way of yet another example, when the mounting bar 70 is in the intermediate position, the first arm 130 may be coupled to one of the first outer receiver 180 or the first inner receiver 200 and the second arm 140 may be coupled to one of the second outer receiver 190 or the second inner receiver 210.

Figure 9:
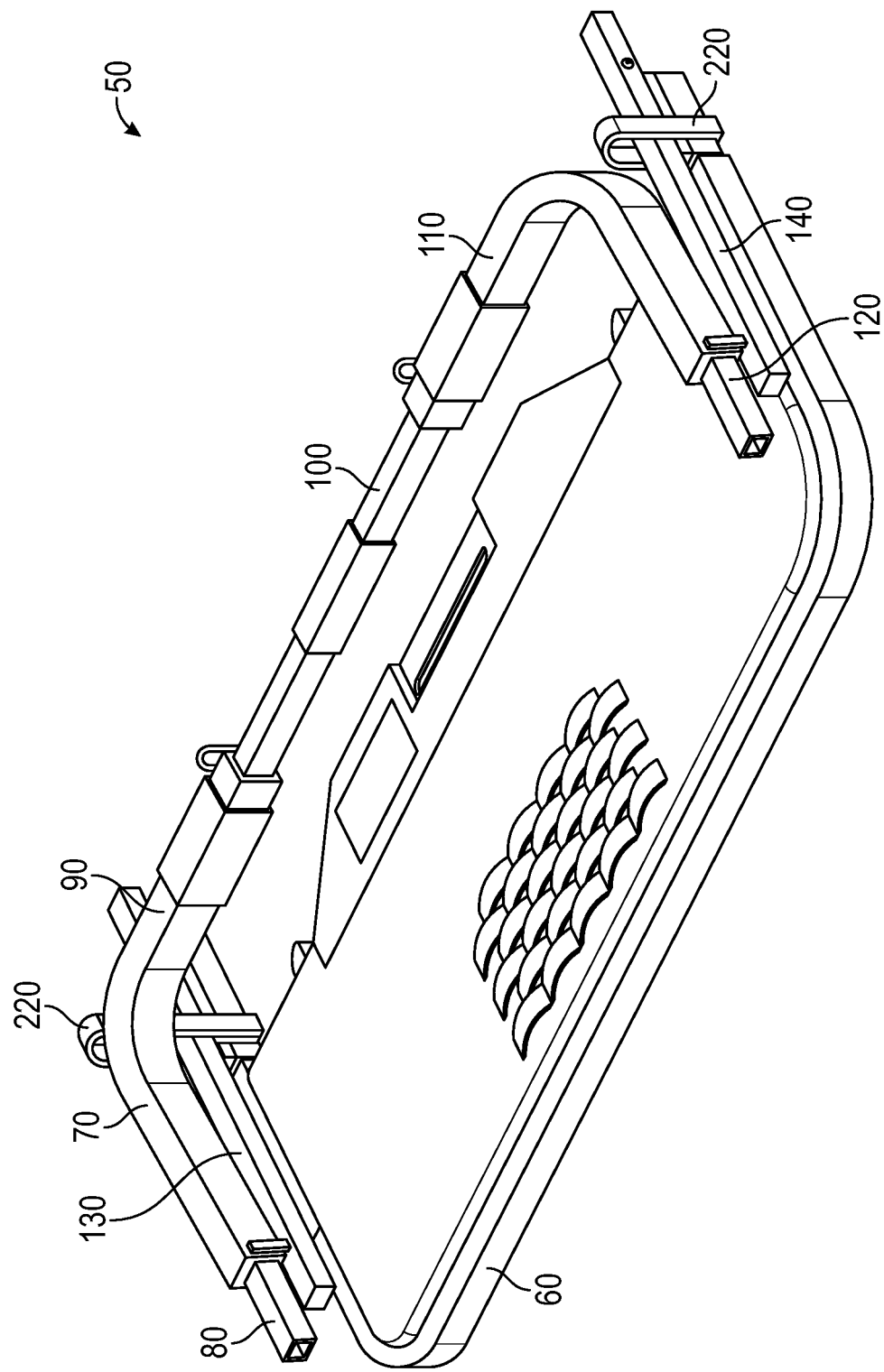
FIGS. 9 and 10 are perspective views of the wheel step platform of FIG. 2, in a folded position, according to an exemplary embodiment.
Figure 10:
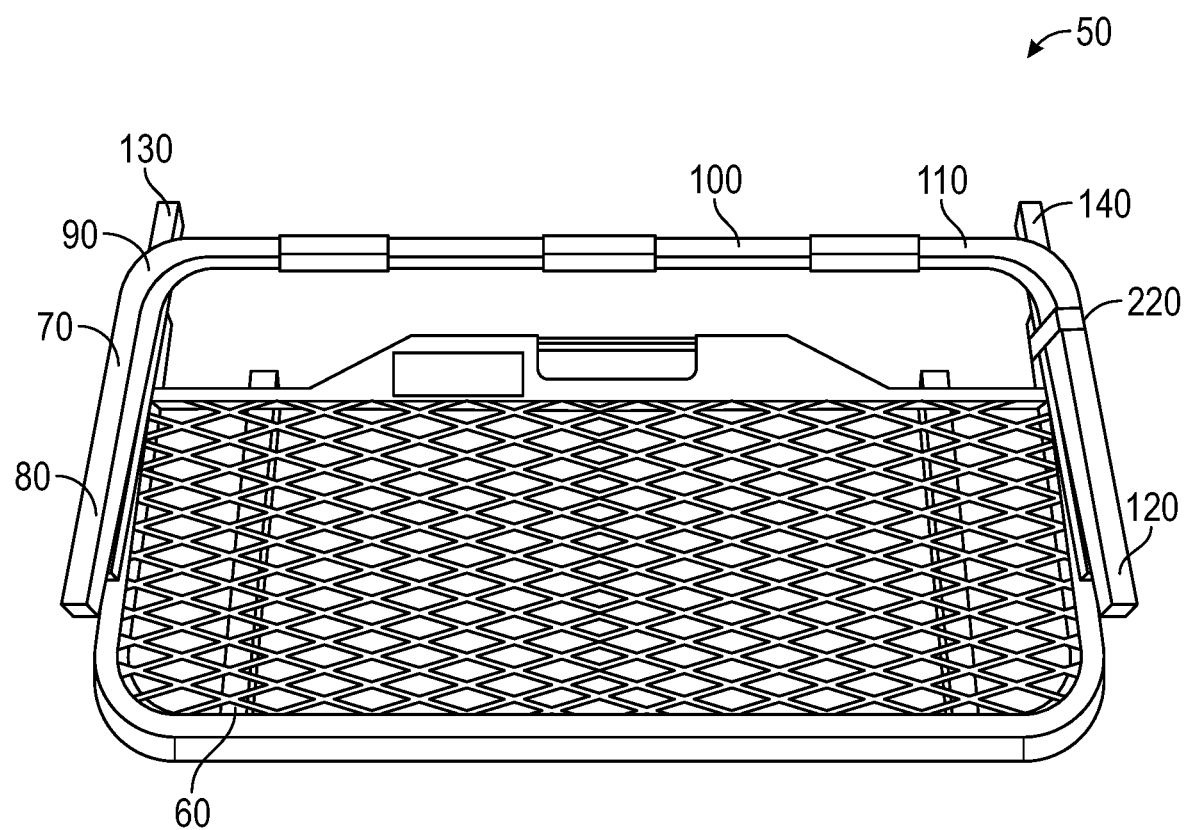

Referring now to FIGS. 9 and 10, various views of the wheel step platform 50 are shown, in the folded position. In the folded position, the set of arms 130 and 140 and the mounting bar 70 are oriented parallel to the platform 60. In some embodiments, at least one of the set of arms 130 and 140 and the mounting bar 70 are not oriented substantially parallel to the platform 60 when the wheel step platform 50 is in the folded position. By way of example, when the wheel step platform 50 is in the folded position, the wheel step platform 50 is configured to have a width of 23.5 inches, a length of 47.25 inches, and a height of 4.38 inches. In some embodiments, the dimensions of the wheel step platform 50 may differ from the disclosed embodiment.

The wheel step platform 50 further includes locking mechanisms, shown as locking clamps 220. The locking clamps 220 are positioned at each end of the platform, proximal to the second pivoting joints 170. The locking clamps 220 are configured to lock the wheel step platform 50 into the folded position to prevent the wheel step platform 50 from becoming unfolded. In some embodiments, the locking clamps 220 are configured to lock the set of arms 130 and 140 to the mounting bar 70. By way of example, two locking clamps 220 are disposed on the wheel step platform 50. In some embodiments, a single locking clamp 220 is disposed on the wheel step platform 50 proximal to one of the set of arms 130 and 140 (e.g., shown in FIG. 10).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein.

What is claimed is:

1. A step platform for a vehicle comprising:
   a mounting bar including a first tube, a second tube, and a third tube, wherein the second tube defines an elbow tube, and wherein the first tube is configured to telescope into and out of a first end of the elbow tube, and the third tube is configured to telescope into and out of a second end of the elbow tube;
   an arm coupled to the mounting bar and extending vertically from the mounting bar, the arm coupled to the mounting bar by a first joint; and
   a platform coupled to the arm, wherein the platform includes a first outer receiver and a first inner receiver, and wherein the first outer receiver is arranged laterally outwardly relative to the first inner receiver;

wherein the first tube is extendable or retractable within the elbow tube to modify a width of the mounting bar, and the third tube is extendable or retractable within the elbow tube to modify a length of the mounting bar between a retracted position and an extended position, and in the retracted position, the arm is coupled to the platform by the first inner receiver, and in the extended position, the arm is coupled to the platform by the first outer receiver.

2. The step platform of claim 1, wherein the step platform is reconfigurable between a folded position and a mounted position, when the step platform is in the mounted position, the platform is arranged parallel to the mounting bar and perpendicular to the arm.

3. The step platform of claim 2, wherein, when the step platform is in the mounted position, the mounting bar is configured to couple to a tractive element of the vehicle by extending about an upper portion of the tractive element.

4. The step platform of claim 2, further comprising a locking mechanism coupled to the mounting bar, the locking mechanism configured to engage the mounting bar to hold the mounting bar in one of the folded position and the mounted position.

5. The step platform of claim 2, wherein, when the step platform is in the folded position, the mounting bar, the arm, and the platform are arranged parallel to one another with the arm being positioned between the mounting bar and the platform.

6. The step platform of claim 1, further comprising a first locking mechanism configured to lock the first tube relative to the elbow tube, and a second locking mechanism configured to lock the third tube relative to the elbow tube.

7. The step platform of claim 6, wherein the first locking mechanism and the second locking mechanism are both in the form of a pin.

8. A vehicle comprising:
a chassis;
a plurality of tractive elements coupled to the chassis; and
a wheel step platform reconfigurable between a folded position and a mounted position, the wheel step platform comprising:
a mounting bar including a first tube, a second tube, and a third tube, wherein the second tube defines an elbow tube, and wherein the first tube is configured to telescope into and out of a first end of the elbow tube, and the third tube is configured to telescope into and out of a second end of the elbow tube;
an arm coupled to the mounting bar by a first joint; and
a platform coupled to the arm, wherein the platform includes a first outer receiver and a first inner receiver, and wherein the first outer receiver is arranged laterally outwardly relative to the first inner receiver;
wherein the first tube is extendable or retractable within the elbow tube to modify a width of the mounting bar, and the third tube is extendable or retractable within the elbow tube to modify a length of the mounting bar between a retracted position and an extended position, and
in the retracted position, the arm is coupled to the platform by the first inner receiver, and
in the extended position, the arm is coupled to the platform by the first outer receiver.

9. The vehicle of claim 8, further comprising a locking mechanism coupled to the mounting bar, the locking mechanism configured to engage the mounting bar to hold the mounting bar in one of the folded position and the mounted position.

10. The vehicle of claim 8, wherein, when the wheel step platform is in the mounted position, the platform is arranged parallel to the mounting bar and perpendicular to the arm.

11. The vehicle of claim 10, wherein when the wheel step platform is in the folded position, the mounting bar, the arm, and the platform are arranged parallel to one another with the arm being positioned between the mounting bar and the platform.

12. The vehicle of claim 8, further comprising a first locking mechanism configured to lock the first tube relative to the elbow tube, and a second locking mechanism configured to lock the third tube relative to the elbow tube.

13. The vehicle of claim 12, wherein the first locking mechanism and the second locking mechanism are both in the form of a pin.

14. A step platform for a vehicle comprising:
a mounting bar including a first tube, a second tube, a third tube, a fourth tube, and a fifth tube, wherein the second tube defines a first elbow tube and the fourth tube defines a second elbow tube, and wherein the first tube is configured to telescope into and out of a first end of the first elbow tube, the third tube is configured to telescope into and out of a second end of the first elbow tube, the fifth tube is configured to telescope into and out of a first end of the second elbow tube, and the third tube is configured to telescope into and out of a second end of the second elbow tube;
a first arm coupled to the mounting bar by the first tube;
a second arm coupled to the mounting bar by the fifth tube;
a platform coupled to the first arm and the second arm, wherein the platform includes a first outer receiver, a second outer receiver, a first inner receiver, and a second inner receiver, and wherein the first outer receiver and the second outer receiver are arranged laterally outwardly relative to the first inner receiver and the second inner receiver;
wherein the first tube and the fifth tube are extendable or retractable within the first elbow tube and the second elbow tube, respectively, to modify a width of the mounting bar, and the third tube is extendable or retractable within both the first elbow tube and the second elbow tube to modify a length of the mounting bar between a retracted position and an extended position, and
in the retracted position, the first arm is coupled to the platform by the first inner receiver and the second arm is coupled to the platform by the second inner receiver, and
in the extended position, the second arm is coupled to the platform by the first outer receiver and the second arm is coupled to the platform by the second outer receiver.

15. The step platform of claim 14, wherein the step platform is reconfigurable between a folded position and a mounted position, when the step platform is in the mounted position, the platform is arranged parallel to the mounting bar and perpendicular to the first arm and the second arm.

16. The step platform of claim 15, wherein, when the step platform is in the folded position, the mounting bar, the first arm, the second arm, and the platform are arranged parallel to one another with both the first arm and the second arm being positioned between the mounting bar and the platform.

17. The step platform of claim 14, further comprising a first locking mechanism configured to lock the first tube relative to the first elbow tube, a second locking mechanism configured to lock the second tube relative to the first elbow tube, a third locking mechanism configured to lock the third tube relative to the second elbow tube, and a fourth locking mechanism configured to lock the fifth tube relative to the second elbow tube.

18. The step platform of claim 17, wherein the first locking mechanism, the second locking mechanism, the third locking mechanism, and the fourth locking mechanism are all in the form of a pin.

* * * * *